United States Patent [19]

Sekiguchi

[11] 4,139,651
[45] Feb. 13, 1979

[54] METHOD OF REMOVING CITRUS-FRUIT-PULP-SEGMENT MEMBRANES

[75] Inventor: Tadashi Sekiguchi, Shizuoka, Japan

[73] Assignee: Toyoseikan Kaisha Ltd., Tokyo, Japan

[21] Appl. No.: 804,513

[22] Filed: Jun. 8, 1977

[30] Foreign Application Priority Data

Jun. 16, 1976 [JP] Japan ................................ 51-69347

[51] Int. Cl.$^2$ ............................................. A23L 1/212
[52] U.S. Cl. .................................... 426/616; 426/442; 426/465
[58] Field of Search ......................... 426/616, 442, 465

[56] References Cited

U.S. PATENT DOCUMENTS

| 2,187,501 | 1/1940 | Lissauer | 426/616 |
| 2,274,874 | 3/1942 | Steinward | 426/616 X |

OTHER PUBLICATIONS

W. V. Creuss, *Commercial Fruit and Vegetable Products*, 3rd edition, McGraw Hill, 1948, pp. 74–80.

*Primary Examiner*—Alvin E. Tanenholtz
*Assistant Examiner*—Robert J. Warden
*Attorney, Agent, or Firm*—Charles E. Brown

[57] ABSTRACT

The membranes of citrus-fruit pulp-segments may be removed in a short time without using an acid liquid by a process comprises separating pulp-segments of peeled fruits from each other, heating the separated pulp-segments with hot water or steam and then immersing the pulp-segments in a solution of a mixture of alkali and phosphate.

8 Claims, No Drawings

METHOD OF REMOVING CITRUS-FRUIT-PULP-SEGMENT MEMBRANES

BACKGROUND OF THE INVENTION

1. Field of the Invention

The present invention relates to a method of removing citrus-fruit pulp-segment membranes and, more particularly, to a method of removing the membranes of the pulp-segments of citrus fruits such as mandarin oranges which pulp-segments have been separated from the rinds of the fruits so as to be canned.

2. Description of the Prior Art

The conventional method for canning syruped citrus fruits usually includes the steps of peeling fruits to be canned, seperating pulp-segments of the peeled fruits from each other, immersing the separated segments in a sulphuric or hydrochloric acid solution of a proper concentration for about 40 minutes, then fully rinsing the segments, immersing the rinsed segments in an aqueous solution of caustic soda of a proper concentration for about 20 minutes, again rinsing the segments, and removing unacceptable segments according to uses, such as incompletely processed, non-smooth or broken segments.

The conventional method has the following disadvantages: the equipment in use tends to be corroded by the action of the acidic liquid used, each process is not effecient, the equipment for use requires a long and wide floor space because mediums for use in processing the segments are changed from acidic solution to water, alkali solution, and then to water, and in addition the yield of acceptable pulp-segments without non-smooth surfaces or defects is low.

SUMMARY OF THE INVENTION

It is an object of the present invention to provide a method of removing citrus-fruit pulp-segment membranes which can give a high segment-membrane removal rate.

It is another object of the present invention to provide a method of removing citrus-fruit pulp-segment membranes which can minimize the number of processes required and the time required for processing, and can perform efficient processing on a very limited floor space.

The present invention is contemplated on the bais of the following findings:

The membranes of citrus-fruit pulp-segments may be removed in a short time without using an acid liquid by a process having the steps of separating pulp-segments of peeled fruits from each other, heating the separated pulp-segments with hot water or steam, and then immersing the pulp-segments pump in a solution of a mixture of alkali and phosphate; the time for the heating step is preferably 10 to 60 seconds.

According to the present invention, therefore, there is provided a method of removing citrus-fruit pulp-segment membranes comprising the steps of separating pulp-segments of peeled citrus fruits from each other, heating the pulp-segments, immersing the heated pulp-segments in an alkali-phosphate mixture solution and rinsing the immersed pulp-segments.

Citrus fruits to which the present invention can be applied include oranges, grapefruits, lemons and the like, in addition to mandarin oranges.

Heating is preferably carried out with hot water, steam or in a steam atmosphere. Heating temperature is 70° C. or higher, preferably 85° C. or higher. Though varying with the heating temperature, heating time is preferably 10 to 60 seconds. The temperature of the pulp-segments after cooling is preferably 60° C. or less.

Used as alkali in this invention may be sodium hydroxide, sodium carbonate, sodium hydrogen carbonate or the like.

Alkali concentration is preferably 0.1 to 1.5% by weight. In the case of sodium hydroxide, however, a concentration of 0.5% or more by weight is not desirable because pulp-segments reacts with alkali in this range.

Potassium phosphate, sodium phosphate, ammonium phosphate, or the like may be used as the above phosphate if aqueous. The alkali-phosphate mixture solution may be prepared by adding free phosphate radicals to the alkali solution while adjusting alkalinity and phosphate ion concentration so that the desired concentration of the mixture solution may be reached, as a matter of course.

The concentration of phosphate is preferably 0.1% by weight to 3.0% by weight, because the phosphate cannot increase its effect any more if its concentration exceeds 3.0% by weight and cannot exhibit its effects if its concentration is lower than 0.1% by weight.

The system for bringing the heated citrus-fruit pulp-segments with the processing solution or alkali-phosphate mixture solution may be either of batch type or continuous type.

According to the present invention, the processing solution is not acidic; therefore, the equipment in use is little corroded, the processes are simplified, the time required for each process is very short, and in addition the segment-membrane removal rate are very high.

EXAMPLES 1 TO 5 AND COMPARATIVE EXAMPLE 1

Mandarin oranges almost uniform in size and shape were mechanically peeled 30 kg for each example to expose groups of their pulp-segments with membranes. In each example, the segments were heated at a temperature for a period shown in Table 1; then the heated segments were immersed in a solution of a mixture of 0.2% NaOH and 0.3% $K_3PO_4$ at 30° C. for 40 minutes. The segments thus processed were then sorted into those whose membranes were well removed and those whose membranes were not acceptably removed. From these results, the segment-membrane removal rate were obtained as shown in Table 1.

Table 1.

| | Heating condition and removal rate | | | | | |
|---|---|---|---|---|---|---|
| | Ex.1 | Ex.2 | Ex.3 | Ex.4 | Ex.5 | C.Ex.1 |
| Heating Temp. | 90°~95° C. | 90°~95° C. | 90°~95° C. | 85°~95° C. | 60° C. | Room temp. |
| Retention time | 20 sec. | 30 sec. | 40 sec. | 20 sec. | 60 sec. | — |
| Removal rate | 81 % | 85 % | 90 % | 62 % | 51 % | 44 % |

EXAMPLE 6 TO 12

Mandarine oranges were peeled 30 kg for each example to obtain exposed groups of their pulp-segments in the same manner as in the case of Examples 1 to 5. In each example the segments were heated at a temperature shown in Table 2 for 30 seconds; then the heated segments were immersed in the same solution as in the case of Examples 1 to 5 at 30° C. for 40 minutes. The segment-membrane removal rate were obtained in the same manner as in the case of Examples 1 to 5. The results are shown in Table 2.

Table 2.

| | Heating temperature and removal rate | | | | | | | |
|---|---|---|---|---|---|---|---|---|
| | C.Ex.1 | Ex.6 | Ex.7 | Ex.8 | Ex.9 | Ex.10 | Ex.11 | Ex.12 |
| Temp. (C) | Room temp. | 40° | 50° | 60° | 70° | 80° | 90° | 100° |
| Removal rate | 44% | 50% | 58% | 58% | 65% | 85% | 95% | 99% |

EXAMPLE 13–17

Mandarine oranges were peeled 30 kg for each example to obtain exposed groups of their pulp-segments according to the same procedure as that described in Example 1 to 5. In each example the segments were kept at a temperature of 95°–100° C. with steam for a period shown in Table 3.

Then, the heated segments were immersed in the same solution as in the case of Example 1 to 5. The segment-membrane removal rate were obtained according to the same manner as described in Example 1 to 5. The results are shown in Table 3.

Table 3.

| | Heating time and the segment-membrane removal rate | | | | | |
|---|---|---|---|---|---|---|
| | C.Ex.1 | Ex.13 | Ex.14 | Ex.15 | Ex.16 | Ex.17 |
| Heating time(second) | — | 10 | 20 | 30 | 60 | 60 |
| Segment-membrane removal rate (%) | 44 | 60 | 85 | 95 | 92 | bad |

It was obtained from Table 1 to 3 that the membranes of citrus-fruit pulp-segments can be removed in a short time by a process comprising the steps of heating the separated pulp-segments at a temperature of 60° C. or more for a period of 10 minutes or more, by adjusting the heating temperature and heating time and immersing the pulp-segments an aqueous solution of alkali and phosphate.

EXAMPLE 18–26, COMPARATIVE EXAMPLE 2–3

Mandarine oranges almost uniform in size and shape were mechanically peeled 30 kg for each example to obtain exposed groups of their pulp-segments with membranes. Thus obtained segments were heated at a temperature of 95° C. for 30 minutes and then immersed in an aqueous solution of the composition as described in Table 4 at 30° C. for 40 minutes. The segment-membrane removal rate of the respective segments was obtained in the same manner as described in Example 1 to 5. The obtained results are shown in Table 4.

Table 4-1

| | (wt %) | | | | | |
|---|---|---|---|---|---|---|
| | Ex.18 | Ex.19 | Ex.20 | Ex.21 | Ex.22 | Ex.23 |
| NaOH | 0.2 | 0.3 | 0.2 | 0.2 | 0.3 | 0.5 |
| Potassium phosphate | 0.2 | 0.2 | 0.3 | 0.5 | 0.5 | 0.2 |
| Sodium phosphate | 0 | 0 | 0 | 0 | 0 | 0 |
| Removal rate | 56 | 71 | 85 | 99 | 99 | 94 |

Table 4-2

| | (wt %) | | | | |
|---|---|---|---|---|---|
| | Ex.24 | Ex.25 | Ex.26 | C.Ex.2 | C.Ex.3 |
| NaOH | 0.5 | 0.1 | 0.3 | 0.3 | 0 |
| Potassium phosphate | 3.0 | 0.5 | 0 | 0 | 3.0 |
| Sodium phosphate | 0 | 0 | 0.2 | 0 | 0 |
| Removal rate | 99 | 89 | 89 | 10 | 42 |

What is claimed is:

1. A method of removing citrus-fruit pulp-segment membranes comprising the steps of heating pulp-segments of peeled citrus fruits, immersing the heated pulp-segments in a solution of a mixture of an alkali and a phosphate, and rinsing the solution-immersed pulp-segments, said alkali being in an amount sufficient to facilitate removal of the pulp-segment membranes but not react with the pulp-segments and said phosphate being present in a concentration of 0.1 to 3% by weight.

2. The method of removing citrus-fruit pulp-segment membranes as set forth in claim 1, wherein said citrus fruits include mandarin oranges, oranges and grapefruits.

3. The method of removing citrus-fruit pulp-segment membranes as set forth in claim 2, wherein said heating step is performed with hot water, steam or in a steam atmosphere.

4. The method of removing citrus-fruit pulp-segment membranes as set forth in claim 3, wherein said heating step is performed at 70° C. or higher, preferably 85° C. or higher.

5. The method of removing citrus-fruit pulp-segment membranes as set forth in claim 1, wherein said heating step is performed with hot water, steam or in a steam atmosphere.

6. The method of removing citrus-fruit pulp-segment membranes as set forth in claim 1, wherein said heating step is performed at 70° C. or higher, preferably 85° C. or higher.

7. The method of claim 1 wherein said alkali is present in a concentration of 0.1 to 1.5% by weight.

8. The method of removing citrus-fruit pulp-segment membranes as set forth in claim 7, wherein said heating step is performed at 70° C. or higher.

* * * * *